US009250259B2

(12) United States Patent
Kazama

(10) Patent No.: US 9,250,259 B2
(45) Date of Patent: Feb. 2, 2016

(54) OBJECT MOTION ANALYSIS APPARATUS, OBJECT MOTION ANALYSIS METHOD, AND STORAGE MEDIUM

(71) Applicant: FUJITSU LIMITED, Kawasaki-shi, Kanagawa (JP)

(72) Inventor: Masaki Kazama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 21 days.

(21) Appl. No.: 14/215,122

(22) Filed: Mar. 17, 2014

(65) Prior Publication Data

US 2014/0200833 A1    Jul. 17, 2014

Related U.S. Application Data

(63) Continuation of application No. PCT/JP2011/071528, filed on Sep. 21, 2011.

(51) Int. Cl.
*G06F 17/50*    (2006.01)
*G01P 15/02*    (2013.01)

(52) U.S. Cl.
CPC ............ *G01P 15/02* (2013.01); *G06F 17/5009* (2013.01); *G06F 2217/16* (2013.01)

(58) Field of Classification Search
CPC .................................................. G06F 17/5009
USPC .......................................................... 702/41
See application file for complete search history.

(56) References Cited

U.S. PATENT DOCUMENTS 5,049,540 A * 9/1991 Park et al. ...................... 505/400
6,014,151 A * 1/2000 Cohen et al. ................... 345/474

FOREIGN PATENT DOCUMENTS

JP    10-185755    7/1998
JP    2008-111675    5/2008

OTHER PUBLICATIONS

Seiichi Koshizuka, et al., "Numerical Analysis of Breaking Waves Using the Moving Particle Semi-Implicit Method", International Journal for Numerical Method in Fluids, 26:751-769 (1998).
J. J. Monaghan, "Smoothed Particle Hydrodynamics", Annu. Rev. Astron. Astrophys. 30: 543-574 (1992).
T. Harada, et al., "An Improvement of Wall Boundary Calculation Model in Smoothed Particle Hydrodynamcis", Transactions of Information Processing Society of Japan, Apr. 15, 2007, vol. 48, No. 4, pp. 1838 to 1846 (English Abstract).
Eran Guendelman et al., Coupling water and Smoke to Thin Deformable and Rigid Shells, ACM Transactions on Graphics, Apr. 2007, vol. 48, No. 4, pp. 973-981.
International Search Report, mailed in connection with PCT/JP2011/071258 and mailed Nov. 22, 2011.
Monaghan, J. J., "Smoothed particle hydrodynamics", Reports on Progress in Physics, Institute of Physics Publishing, Bristol, GB, vol. 68, No. 8, Aug. 2005, pp. 1703-1759, XP020084661.
European Search Report dated Oct. 23, 2015 for corresponding European Patent Application No. 11872817.9, 6 pages.

* cited by examiner

*Primary Examiner* — Bryan Bui
(74) *Attorney, Agent, or Firm* — Fujitsu Patent Center

(57) ABSTRACT

An object motion analysis apparatus includes a processor configured to generate a connection element connecting multiple first particles included in a first object based on physical quantity data of the first particles, refer to physical quantity data of a second particle included in a second object, calculate a shortest distance between the second particle and the generated connection element, calculate a repulsive force between the first object and the second particle based on the calculated shortest distance, and analyze motion of the first object and the second object based on the calculated repulsive force.

15 Claims, 14 Drawing Sheets

FIG.3
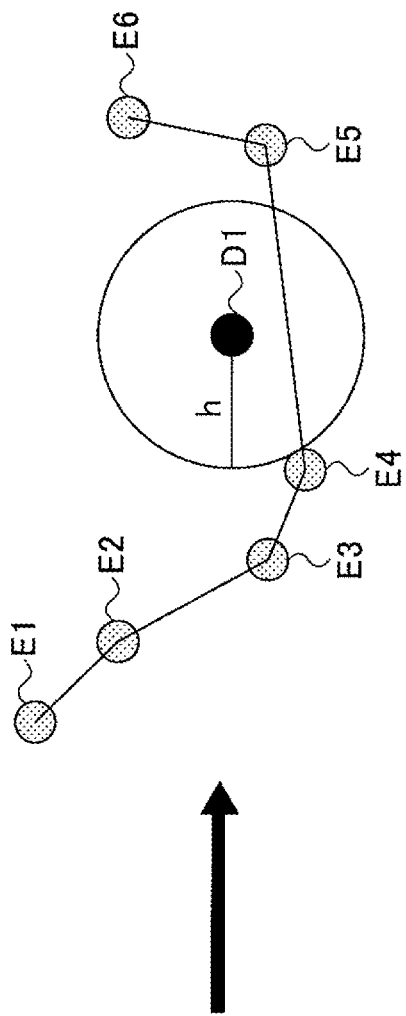
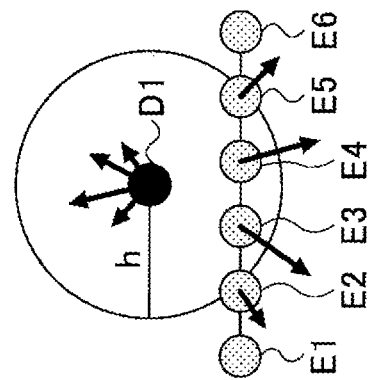

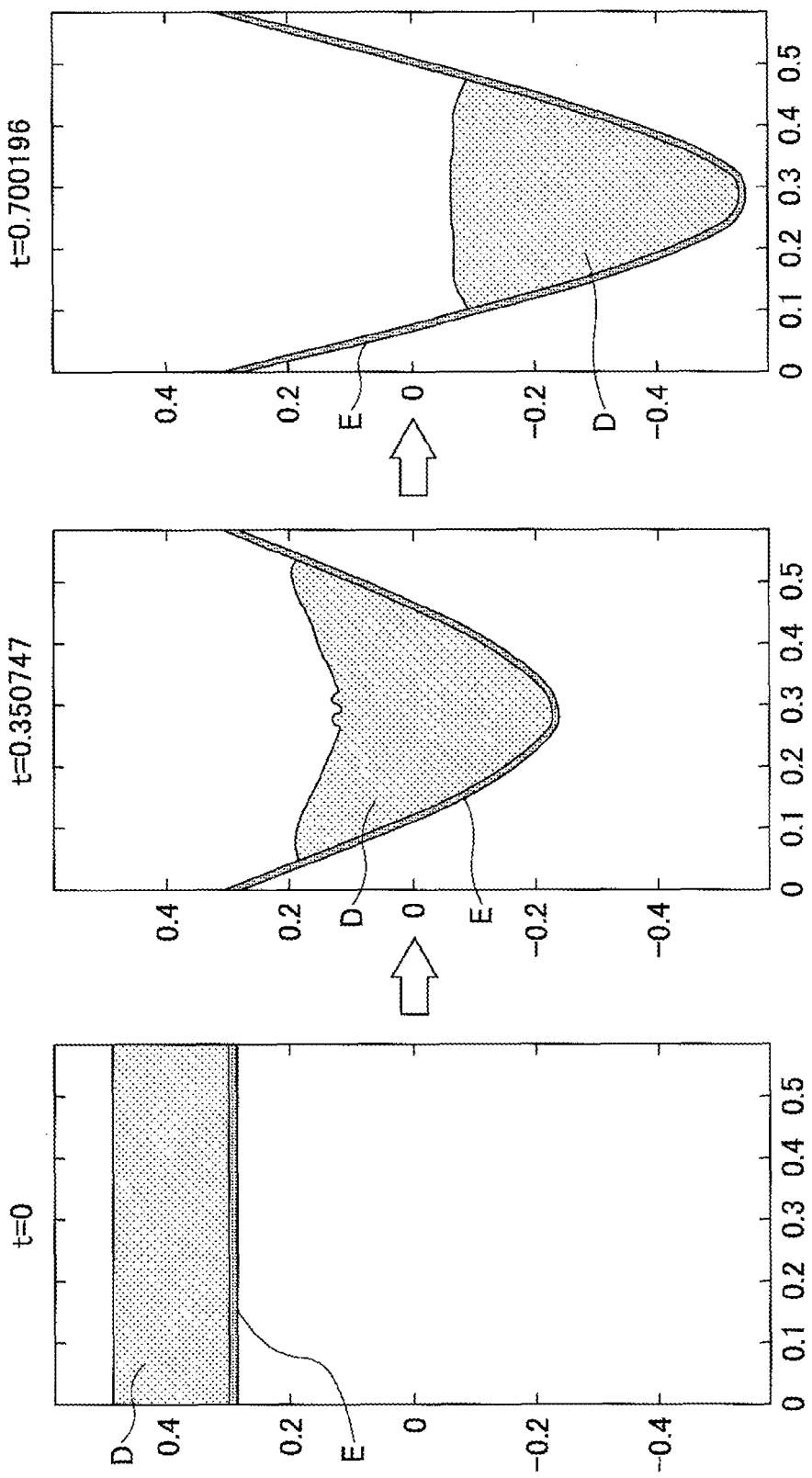

OBJECT MOTION ANALYSIS APPARATUS, OBJECT MOTION ANALYSIS METHOD, AND STORAGE MEDIUM

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2011/071528, filed on Sep. 21, 2011 and designated the U.S., the entire contents of which are incorporated herein by reference.

FIELD

An aspect of this disclosure relates to an object motion analysis apparatus, an object motion analysis method, and a storage medium.

BACKGROUND

In various fields, there have been attempts to analyze the behavior of an object by reproducing the motion of the object on a computer. The reproduction of object motion by a computer may be widely used to analyze, for example, the motion of a golf ball hit by a club, the resistance of a building to a tsunami, the behavior of a rubber film attached to a container for containing a liquid, etc.

Examples of objects whose motion is analyzed include fluids and elastic bodies. Numerical methods such as the finite difference method, the finite element method, and the finite volume method, which obtain an approximate solution of a differential equation based on the numerical mesh, have been widely used to solve a continuum of fluid or elastic body. In recent years, numerical methods have been advanced so that they can be used in fields such as computer aided engineering (CAE) and to solve a problem of interaction between a fluid and a structure. However, handling of calculation methods using the mesh is complicated when they are applied to, for example, a problem involving an interface such as a free surface or the problem of the interaction between a fluid and a structure involving a moving boundary, and therefore programming for such calculation methods tends to be difficult.

There also exist particle methods that analyze an object as a set of particles. Well-known particle methods include a Moving Particle Semi-implicit (MPS) method and a Smoothed Particle Hydrodynamics (SPH) method (see, for example, S. Koshizuka, A. Nobe and Y. Oka, "Numerical Analysis of Breaking Waves Using The Moving Particle Semi-Implicit Method", International Journal for Numerical Method in Fluids, 26: 751-769 (1998); and J. J. Monaghan, "Smoothed Particle Hydrodynamics", Annu. Rev. Astron. Astrophys. 30: 543-74 (1992)). Because particle methods do not require a special procedure for handling a moving boundary, they have become widely used even for the problem of the interaction between the fluid and the structure.

For example, there exists an analysis apparatus that records data regarding the velocity, position, and pressure for each of first particles representing a fluid and each of second particles representing a wall contacting the fluid, and analyze the behavior of the fluid taking into account a contact angle (see, for example, Japanese Laid-Open Patent Publication No. 2008-111675).

In calculations according to a particle method, a continuum is divided into particle distributions, and a resultant force of stress of the continuum is expressed by a sum of forces of interaction between particles. When the particles come close to each other, a repulsive force is generated as a result of increased pressure. For this reason, the particles do not become excessively dense or sparse.

Interaction is expressed using kernel functions that are used to construct a continuum field from particle distributions. In the SPH method, for example, a problem for solving the motion of a fluid is reduced to ordinary differential equations expressed by formulas (1) through (4) below. Formulas (1) and (2) discretize the conservation of momentum of fluid, and formula (3) discretizes the conservation of mass of fluid. Formula (4) is a simple example of a fluid equation where the density and the pressure have a linear relationship. Instead of formula (4), any other equation of state may be used. In the formulas, a subscript "i" indicates a particle number. The position vector, velocity vector, density, and pressure of an i-th particle are represented by $\#r_i$, $\#v_i$, $\rho_i$, and $p_i$, respectively. Here, "#" indicates that the following alphabetic character represents a vector. Also, mj indicates the mass of a j-th particle.

$$\frac{dr_i}{dt} = v_i \tag{1}$$

$$\frac{dv_i}{dt} = -\sum_j m_j \left( \frac{p_i + p_j}{\rho_i \rho_j} \right) \frac{\partial W(|r_i - r_j|, h)}{\partial r_i} \tag{2}$$

$$\frac{d\rho_i}{dt} = \sum_j m_j \frac{\rho_i}{\rho_j} (v_i - v_j) \cdot \frac{r_i - r_j}{|r_i - r_j|} \frac{\partial W(|r_i - r_j|, h)}{\partial (|r_i - r_j|)} \tag{3}$$

$$p_i = c(\rho_i - \rho_0) \tag{4}$$

For "W" in formula (3), for example, a cubic spline function may be used as a kernel function. When the kernel function is expressed by formula (5) below, "h" indicates the radius of the support of the kernel function.

$$W(r, h) = \begin{cases} \left(1 - 1.5\left(\frac{r}{h}\right)^2 + 0.75\left(\frac{r}{h}\right)^3\right)/\beta & 0 \leq \frac{r}{h} < 1 \\ 0.25\left(2 - \frac{r}{h}\right)^3 / \beta & 1 \leq \frac{r}{h} < 2 \\ 0 & 2 \leq \frac{r}{h} \end{cases} \tag{5}$$

In other words, "h" represents the radius of influence of particles, and is often set at a value that is two to three times greater than the initial average distance between particles. Also in formula (5), β indicates a value that is adjusted so that the total space integral of the kernel function becomes 1. When the kernel function is two-dimensional, β is set at 0.7 $\pi h^2$. When the kernel function is three-dimensional, β is set at $\pi h^3$.

In the SPH method, formula (3) indicates that density increases as particles come closer to each other, formula (4) indicates that pressure increases as the density increases, and formula (2) indicates that a force is generated in a direction from a higher pressure area toward a lower pressure area and results in a repulsive force between particles. FIG. 1 is a drawing illustrating a repulsive force f generated between particles i and j coming closer to each other.

Thus, in the related-art particle method, it is assumed that stationary particles are arranged on a boundary and a repulsive force is generated between the stationary particles and particles coming closer to the boundary to express impermeability (which indicates that an object does not penetrate through a boundary of another object). In the case of a fluid-structure coupled problem, the interaction between a fluid and a structure is expressed based on a pressure applied to boundary particles of the structure. FIG. 2 is a drawing illustrating a particle D1 of a fluid receiving repulsive forces f from particles E1, E2, . . . of a wall.

SUMMARY

According to an aspect of this disclosure, there is provided an object motion analysis apparatus that includes a processor configured to generate a connection element connecting multiple first particles included in a first object based on physical quantity data of the first particles, refer to physical quantity data of a second particle included in a second object, calculate a shortest distance between the second particle and the generated connection element, calculate a repulsive force between the first object and the second particle based on the calculated shortest distance, and analyze motion of the first object and the second object based on the calculated repulsive force.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a drawing illustrating a case in a related-art particle method where a boundary condition becomes unsatisfied;

FIG. 20 is a drawing illustrating states of a rubber film at different stages in a simulation performed according to a method of an embodiment.

DESCRIPTION OF EMBODIMENTS

Figure 1:
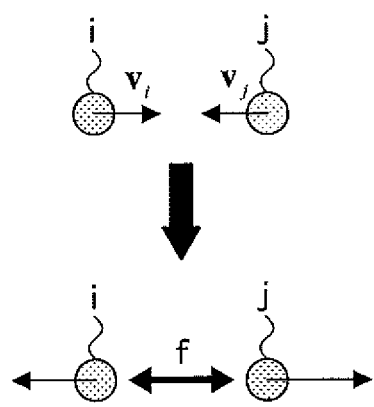
FIG. 1 is a drawing illustrating a repulsive force generated between particles coming closer to each other.
Figure 2:
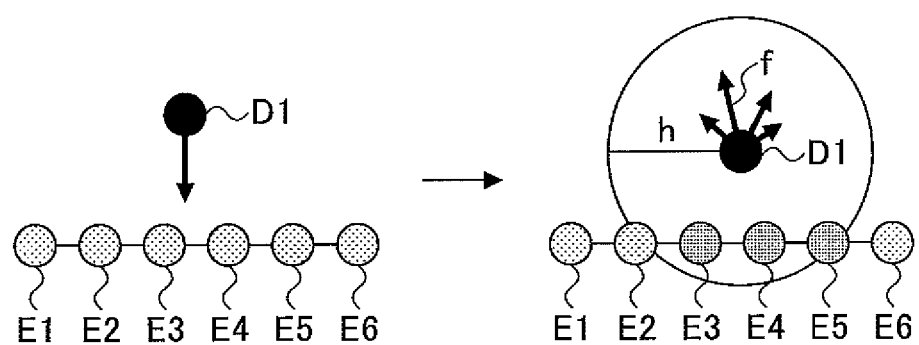
FIG. 2 is a drawing illustrating a particle of a fluid receiving repulsive forces from particles of a wall.

With the related-art particle method described above, it is not possible to ensure that a boundary condition, which requires that particles of a fluid do not penetrate through a boundary of a structure, is satisfied. FIG. 3 is a drawing illustrating a case in the related-art particle method where the boundary condition becomes unsatisfied. For example, when the distance between particles of a wall-side object increases as a result of extension or deformation of the wall-side object and exceeds a value that is two times greater than a radius of influence h of an approaching particle D1, the related-art method may produce an unphysical calculation result where the particle D1 does not receive a sufficient repulsive force from the particles of the wall-side object and penetrates through the boundary.

Accordingly, it is an object in one aspect of the embodiment to provide an object motion analysis apparatus in which generation of an analysis result indicating unphysical behavior is prevented.

Embodiments of the present invention are described below with reference to the accompanying drawings. In a first embodiment, motion analysis on a two-dimensional plane is described. In a second embodiment, motion analysis in a three-dimensional space is described. In a third embodiment, motion analysis in a two-dimensional fluid-structure coupled problem is described.

In the drawings and formulas, vector notation is used. In the descriptions, "#" indicates that the following alphabetic character represents a vector.

EMBODIMENTS

First Embodiment

An object motion analysis apparatus, an object motion analysis method, and an object motion analysis program according to the first embodiment of the present invention are described below.

[Hardware Configuration]

Figure 4:
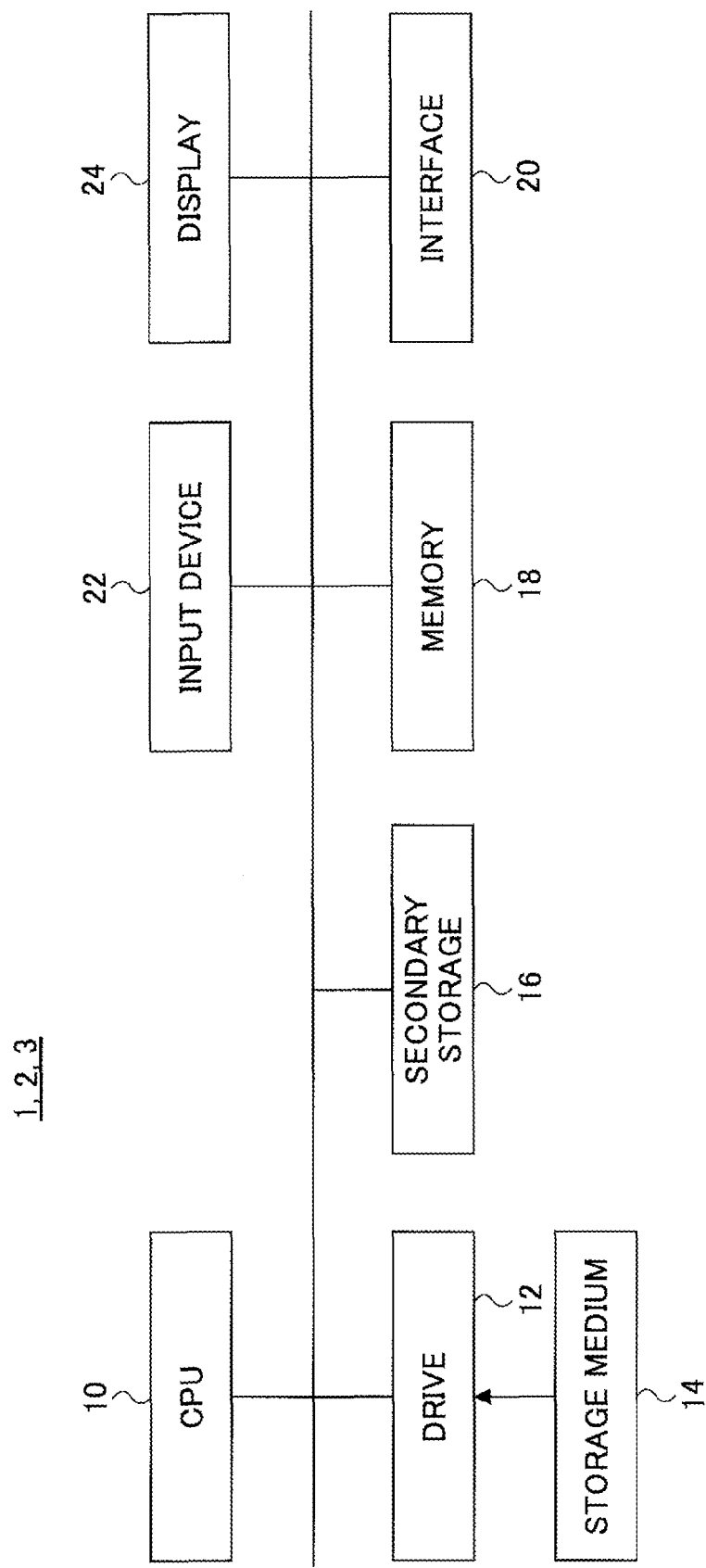
FIG. 4 is a drawing illustrating an exemplary hardware configuration of an object motion analysis apparatus according to a first embodiment.

FIG. 4 is a drawing illustrating an exemplary hardware configuration of an object motion analysis apparatus 1 according to the first embodiment of the present invention. The object motion analysis apparatus 1 is, for example, an information processing apparatus that includes a central processing unit (CPU) 10, a drive 12, a secondary storage 16, a memory 18, an interface 20, an input device 22, and a display 24 that are connected to each other via a bus or a serial line.

The CPU 10 is a processor that includes, for example, a program counter, an instruction decoder, computing units, a load store unit (LSU), and a general-purpose register.

The drive 12 reads programs and data from a storage medium 14. When the storage medium 14 storing programs is mounted on the drive 12, the programs are read by the drive 12 from the storage medium 14 and installed in the secondary storage 16. The storage medium 14 is, for example, a portable storage medium such as a compact disk read-only memory (CD-ROM), a digital versatile disk (DVD), or a Universal Serial Bus (USB) memory. The secondary storage 16 is, for example, a hard disk drive (HDD) or a flash memory.

In addition to installing programs from the storage medium 14 as described above, programs may also be downloaded from another computer via the interface 20 and a network and installed into the secondary storage 16. The network is, for example, the Internet, a local area network (LAN), or a wireless network. Further, programs may be stored in the secondary storage 16 and/or a read-only memory (ROM) before the shipment of the information processing apparatus.

The CPU 10 executes the installed or stored programs to cause the information processing apparatus illustrated by FIG. 4 to function as the object motion analysis apparatus 1 of the present embodiment.

The memory 18 may be implemented, for example, by a random access memory (RAM) and/or an electrically erasable and programmable read-only memory (EEPROM). The interface 20 controls, for example, a connection between the object motion analysis apparatus 1 and the network.

The input device 22 may be implemented by, for example, a keyboard, a mouse, a touchpad, a touch panel, and/or a microphone. The display 24 is, for example, a liquid crystal display (LCD) or a cathode ray tube (CRT) display. The object motion analysis apparatus 1 may also include other types of output devices such as a printer and a speaker in addition to the display 24.

[Functional Configuration]

Figure 5:
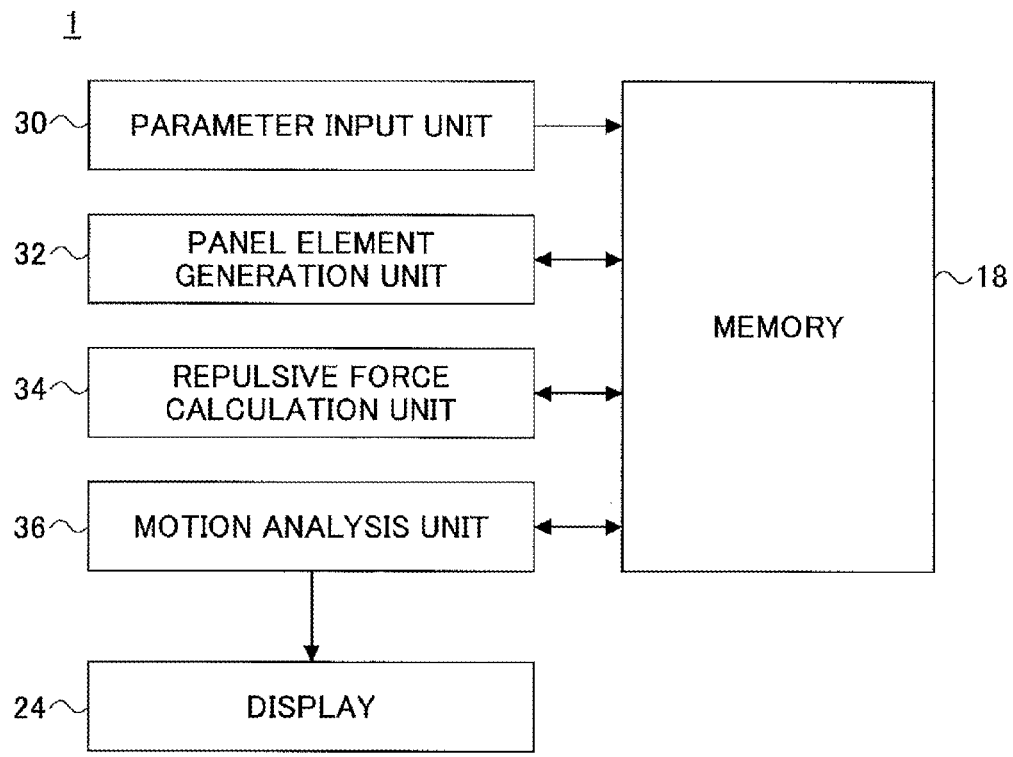
FIG. 5 is a block diagram illustrating an exemplary functional configuration of the object motion analysis apparatus according to the first embodiment.

FIG. 5 is a drawing illustrating an exemplary functional configuration of the object motion analysis apparatus 1 according to the first embodiment of the present invention. The object motion analysis apparatus 1 includes a parameter input unit 30, a panel element generation unit 32, a repulsive force calculation unit 34, and a motion analysis unit 36. These functional blocks are implemented by executing programs or software stored in, for example, the secondary storage 16 by the CPU 10. These functional blocks may not necessarily be implemented by separate programs. Instead, the functional blocks may be provided as subroutines or functions that are called by another program. Also, some of the functional blocks may be implemented by hardware components such as an integrated circuit (IC) and a field programmable gate array (FPGA).

The parameter input unit 30 receives physical quantity data such as coordinates, velocity, connection relationship, and mass of particles constituting an object to be analyzed, and stores the data in the memory 18. The data may be stored in advance in the secondary storage 16 or may be input by a user via the input device 22. Also, the data may be installed from the storage medium 14 into the secondary storage 16, or obtained via the interface 20 from the network.

Objects to be analyzed may be in various states. In the present embodiment, a method of calculating a repulsive force between a particle D1 of an object D on a plane and multiple particles (E1, E2, E3, . . . ) of an object E on the same plane is described as an example. Physical quantities (gravity, velocity, rotational speed, etc.) other than the repulsive force may be calculated by using other generally-known physics methods.

In the descriptions below, the object D is treated as if the object D consists of only one particle. Alternatively, as described in the third embodiment, it is possible to analyze motion based on an assumption that each of multiple particles of the object D receives a repulsive force from the object E.

Figure 6:
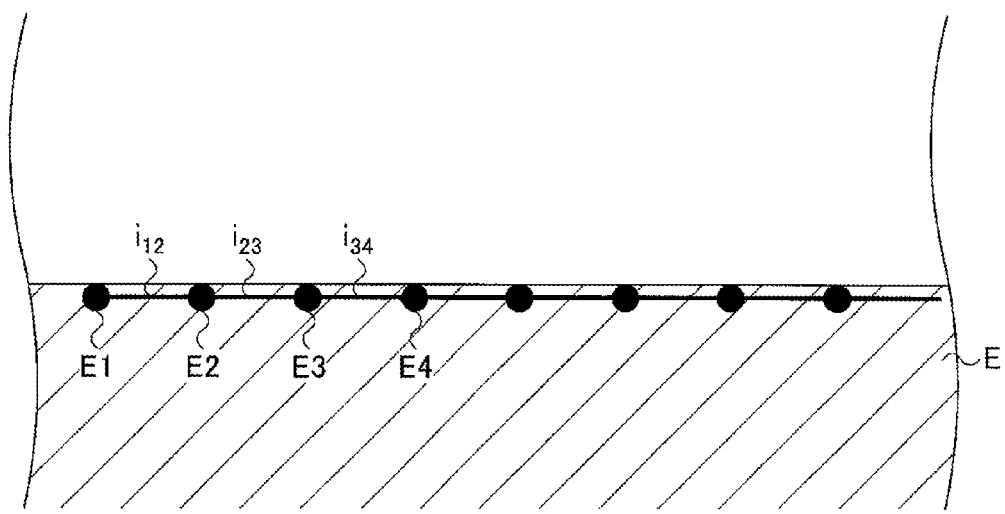
FIG. 6 is a drawing used to describe a method of defining panel elements based on particles located on an outer edge of an object.

The panel element generation unit 32 reads the data stored in the memory 18, extracts particles (E1, E2, E3, . . . ) located on the outer edge (boundary line) of the object E, and stores the extracted particles in the memory 18. Next, the panel element generation unit 32 connects the extracted particles with a straight line, defines each line segment connecting a pair of particles as a panel element i or a connection element, and stores the panel elements i in the memory 18. FIG. 6 is a drawing used to describe a method of defining panel elements i ($i_{12}$, $i_{23}$, $i_{34}$, . . . ) based on particles located on the outer edge of the object E.

In the descriptions below, it is assumed that each panel element i is identified by start coordinates $\#r_{s,i}$ and end coordinates $\#r_{e,i}$.

The repulsive force calculation unit 34 calculates the shortest distance between the particle D1 and each of the panel elements i. Here, the position of the particle D1 is indicated by a point #p. The repulsive force calculation unit 34 calculates values represented by formulas (6) through (8) below, and defines the positional relationship between the particle D1 and each panel element i.

$$dr_i = r_{e,i} - r_{s,i} \tag{6}$$

$$dp_i = p - r_{s,i} \tag{7}$$

$$D_{p,i} = \frac{dp_i \cdot dr_i}{|dr_i|^2} \tag{8}$$

When $D\#_{p,i}$ is within a range $0<D\#_{p,i}<1$, the particle D1 and the panel element i are in such a positional relationship that the perpendicular from the point #p to the panel element i intersects with the panel element i. In this case, the repulsive force calculation unit 34 determines that the length of the perpendicular from the point #p to the panel element i is the shortest distance between the point #p and the panel element i. When $D\#_{p,i} \leq 0$ or $1 \leq D\#_{p,i}$, the repulsive force calculation unit 34 determines that the distance between the point #p and one of the point $\#r_{s,i}$ and the point $\#r_{e,i}$ that is closer to the point #p is the shortest distance between the point #p and the panel element i.

Figure 7:
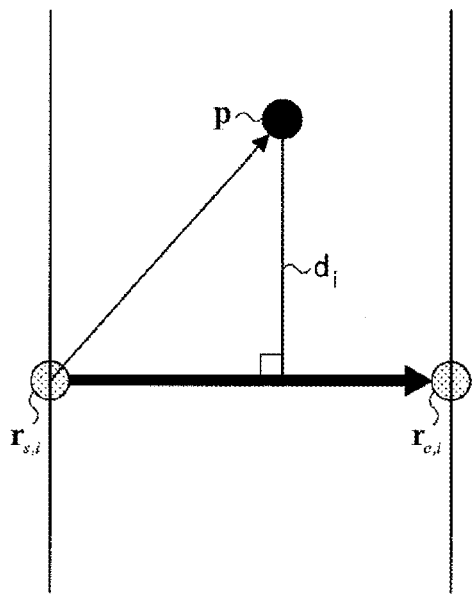
FIG. 7 is a drawing illustrating a positional relationship and the shortest distance between a particle and a panel element when $D_{\#p,i}$ is between 0 and 1.
Figure 8:
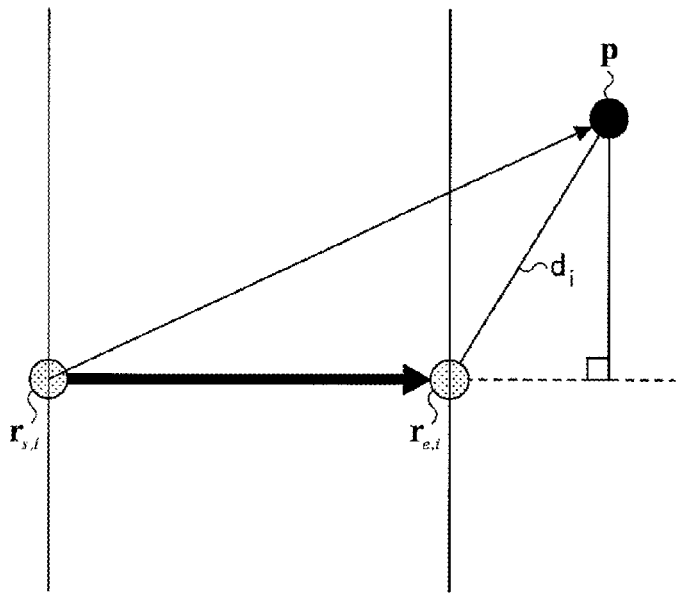
FIG. 8 is a drawing illustrating a positional relationship and the shortest distance between a particle and a panel element when $D_{\#p,i}$ is not between 0 and 1.

FIG. 7 illustrates the positional relationship and the shortest distance when $D\#_{p,i}$ is within a range $0<D\#_{p,i}<1$. FIG. 8 illustrates the positional relationship and the shortest distance when $D\#_{p,i} \leq 0$ or $1 \leq D\#_{p,i}$.

A shortest distance $d_{\#p,2}$ ($\#r_{s,i}$, $\#r_{e,i}$) between the point #p and the panel element i is obtained by formulas (9) and (10) below.

$$d_{p,2}(r_{s,i}, r_{e,i}) = |p - r_i| \tag{9}$$

$$r_i = \begin{cases} r_{s,i} + D_{p,i} dr_i & 0 < D_{p,i} < 1 \\ r_{s,i} & D_{p,i} \leq 0 \\ r_{e,i} & D_{p,i} \geq 1 \end{cases} \tag{10}$$

Figure 9:
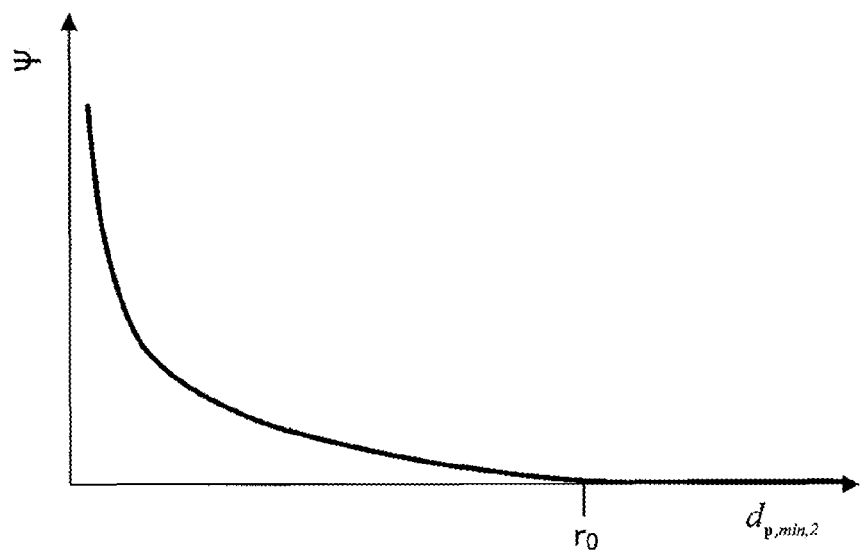
FIG. 9 is a graph illustrating a characteristic of a potential function.
Figure 10:
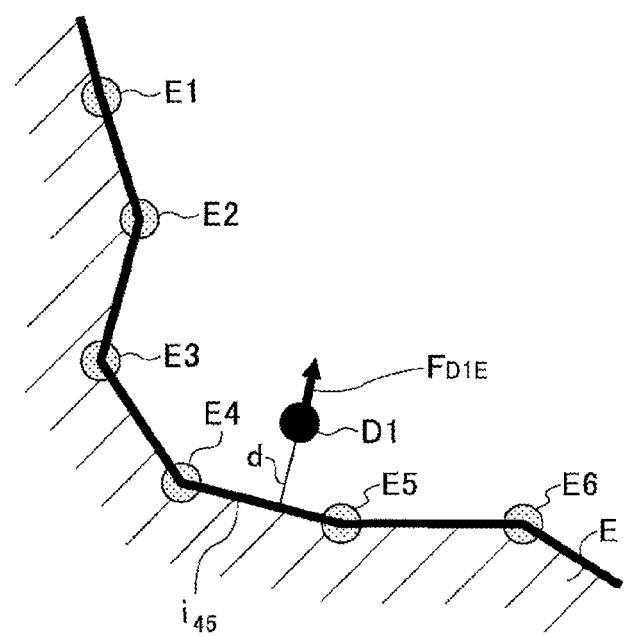
FIG. 10 is a drawing illustrating a repulsive force between a particle and an object.

The repulsive force calculation unit 34 calculates the shortest distances $d_{\#p,2}$ ($\#r_{s,i}$, $\#r_{e,i}$) between the point #p and the respective panel elements i (i=1 through n). Next, the repulsive force calculation unit 34 extracts a distance $d_{\#p,min,2}$ that is the smallest one of the shortest distances $d_{\#p,2}$ ($\#r_{s,i}$, $\#r_{e,i}$) between the point #p and the respective panel elements i (i=1 through n) according to formula (11) below, and defines a potential function ψ based on the distance $d_{\#p,min,2}$ and formula (12) below. FIG. 9 is a graph illustrating a characteristic of the potential function ψ. As illustrated by FIG. 9, the value and gradient of the potential function ψ increase as the distance $d_{\#p,min,2}$ approaches zero, and come close to zero as the distance $d_{\#p,min,2}$ approaches $r_0$. The repulsive force calculation unit 34 also calculates a repulsive force $f_{D1E}$ between the particle D1 and the object E by differentiating the potential function ψ. Because the potential function ψ has the characteristic as illustrated by FIG. 9, the repulsive force $f_{D1E}$ increases as the distance $d_{\#p,min,2}$ decreases and approaches zero, and comes close to zero as the distance $d_{\#p,min,2}$ increases and approaches $r_0$. FIG. 10 is a drawing illustrating the repulsive force $f_{D1E}$ between the particle D1 and the object E. In FIG. 10, $i_{45}$ indicates a panel element whose shortest distance to the particle D1 is the smallest (i.e., a panel element closest to the particle D1).

$$d_{p,min,2} = \min_i d_{p,2}(r_{s,i}, r_{e,i}) \quad (11)$$

$$\varphi(p, r_{s,0}, r_{e,0}, r_{s,1}, r_{e,1}, \ldots, r_{s,i}, r_{e,i}, \ldots) = \quad (12)$$
$$\begin{cases} (1 - \log(d_{p,min,2}/r_0) - d_{p,min,2}/r_0) & d_{p,min,2} < r_0 \\ 0 & \text{otherwise} \end{cases}$$

The motion analysis unit 36 analyzes the motion of the objects D and E based on the repulsive force $f_{D1E}$ calculated by the repulsive force calculation unit 34 and other physical quantities (gravity, velocity, rotational speed, etc.). Descriptions of motion analysis based on forces being exerted on objects are omitted here, because various methods are already known.

Here, the object motion analysis method of the present embodiment is compared with the related-art particle method. As described above, when the distance between particles of a wall-side object increases due to extension or deformation of the wall-side object, the related-art particle method may produce an unphysical calculation result where an approaching particle does not receive a sufficient repulsive force from the particles of the wall-side object and penetrates through the boundary of the wall-side object. When a large number of particles are arranged on a boundary of a structure to prevent this problem, the computational complexity greatly increases.

On the other hand, the object motion analysis apparatus 1 of the present embodiment is configured to calculate a repulsive force based on shortest distances from the object D to respective panel elements connecting particles of the object E, and does not produce a calculation result where the object D penetrates through the boundary of the object E even when the object E is deformed greatly. This configuration also makes it possible to cover the outer edge (boundary line) of the object E with panel elements instead of arranging a large number of particles on the outer edge of the object E, and thereby makes it possible to prevent increase in calculation costs. Thus, the present embodiment makes it possible to quickly obtain an analysis result while preventing generation of an analysis result indicating unphysical behavior.

An object motion analysis apparatus, an object motion analysis method, and an object motion analysis program according to the above embodiment can quickly obtain an analysis result while preventing generation of an analysis result indicating unphysical behavior.

Second Embodiment

An object motion analysis apparatus, an object motion analysis method, and an object motion analysis program according to the second embodiment of the present invention are described below.

The hardware configuration of an object motion analysis apparatus 2 of the second embodiment is substantially the same as that described in the first embodiment, and therefore the description of the hardware configuration is omitted here.

[Functional Configuration]

Figure 11:
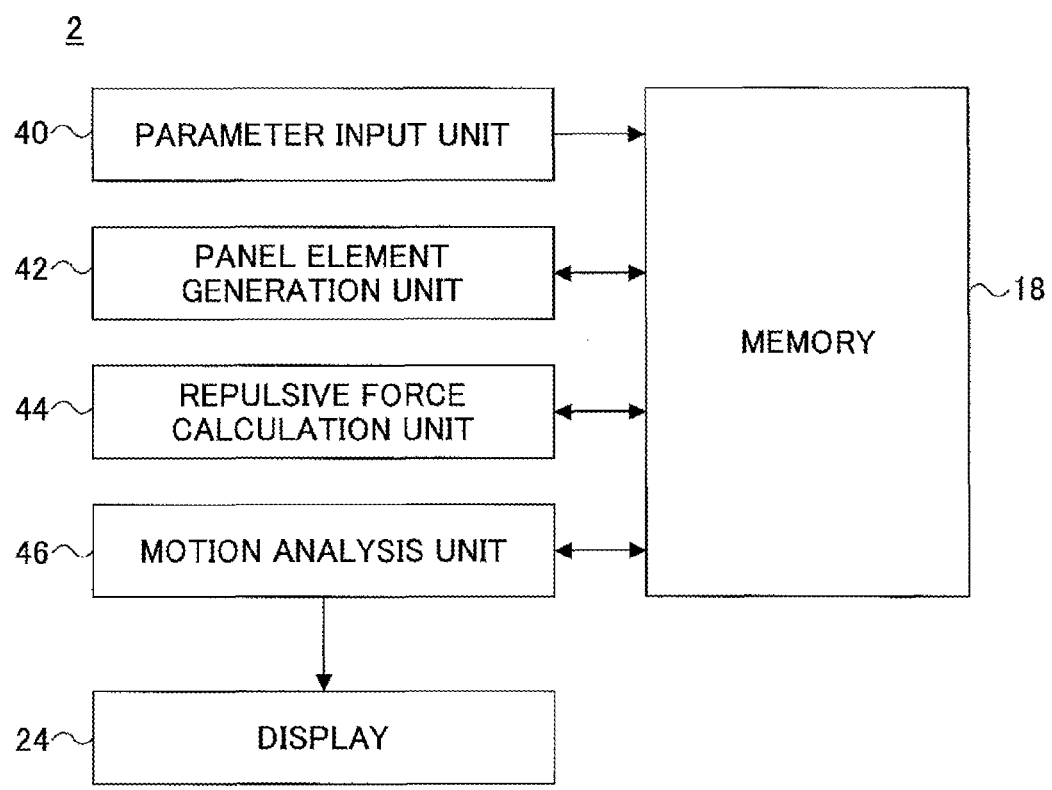
FIG. 11 is a block diagram illustrating an exemplary functional configuration of an object motion analysis apparatus according to a second embodiment.

FIG. 11 is a drawing illustrating an exemplary functional configuration of the object motion analysis apparatus 2 according to the second embodiment of the present invention. The object motion analysis apparatus 2 includes a parameter input unit 40, a panel element generation unit 42, a repulsive force calculation unit 44, and a motion analysis unit 46. These functional blocks are implemented by executing programs or software stored in, for example, the secondary storage 16 by the CPU 10. These functional blocks may not necessarily be implemented by separate programs. Instead, the functional blocks may be provided as subroutines or functions that are called by another program. Also, some of the functional blocks may be implemented by hardware components such as an integrated circuit (IC) and a field programmable gate array (FPGA).

The parameter input unit 40 receives data including the coordinates, velocity, connection relationship, and mass of particles constituting an object to be analyzed, and stores the data in the memory 18. Physical quantity data to be received by the parameter input unit 40 of the present embodiment may be stored in advance in the secondary storage 16 or may be input by a user via the input device 22. Also, the data may be installed from the storage medium 14 into the secondary storage 16. Objects to be analyzed may be in various states. In the present embodiment, a method of calculating a repulsive force between a particle D1 of an object D in a space and multiple particles (E1, E2, E3, . . . ) of an object E in the same space is described as an example. Physical quantities (gravity, velocity, rotational speed, etc.) other than the repulsive force may be calculated by using other generally-known physics methods.

Figure 12:
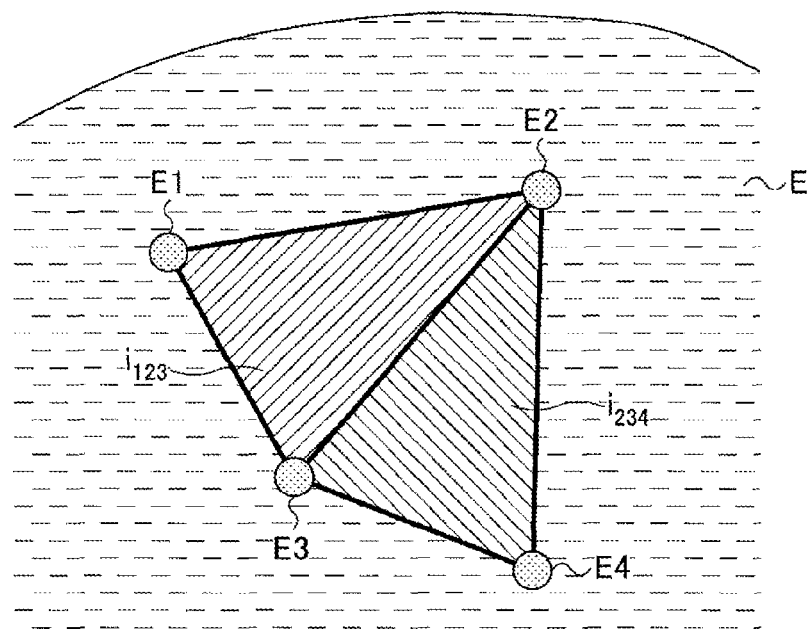
FIG. 12 is a drawing used to describe a method of defining panel elements based on particles located on an outer edge of an object.

The panel element generation unit 42 reads the data stored in the memory 18, extracts particles (E1, E2, E3, . . . ) located on the outer edge (boundary surface) of the object E, and stores the extracted particles in the memory 18. Next, the panel element generation unit 42 connects the extracted particles to form a mesh, defines each triangular surface formed by line segments connecting three particles as a panel element i or a connection element, and stores the panel elements i in the memory 18. FIG. 12 is a drawing used to describe a method of defining panel elements i ($i_{123}$, $i_{234}$, . . . ) based on particles located on the outer edge of the object E. The panel element i used for analysis in a three-dimensional space may also have a shape (e.g., a quadrangle) other than a triangle.

In the descriptions below, it is assumed that each panel element i is identified by coordinates $\#r_{1,i}$, $\#r_{2,i}$, and $\#r_{3,i}$ of three points.

The repulsive force calculation unit 44 calculates the shortest distance between the particle D1 and each of the panel elements i. Similarly to the first embodiment, the position of the particle D1 is indicated by a point #p. The repulsive force calculation unit 44 calculates the shortest distance between the point #p and each triangular panel element i that is a closed area defined by three points, through a process described below.

Figure 13:
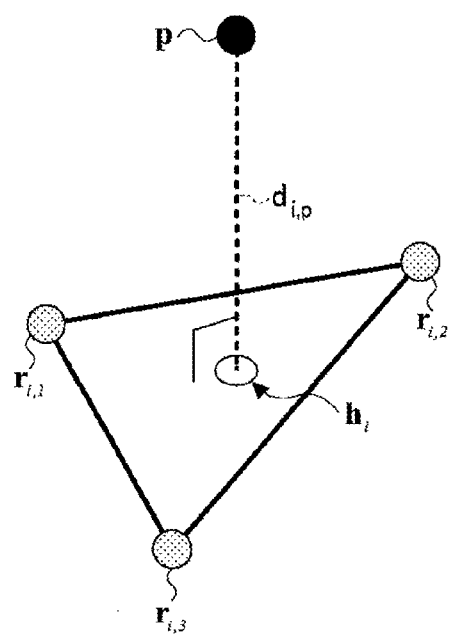
FIG. 13 is a drawing used to describe a method of obtaining a projective point of a point #p on a plane including a triangular panel element.

First, the repulsive force calculation unit 44 obtains a projective point #$h_i$ of the point #p on a plane including the triangular panel element i. FIG. 13 is a drawing used to describe a method of obtaining the projective point #$h_i$ of the point #p on a plane including the triangular panel element i.

When the projective point #$h_i$ is included in the triangular panel element i, the repulsive force calculation unit 44 determines that the distance between the point #p and the projective point #$h_i$ is the shortest distance.

When the projective point #$h_i$ is not included in the triangular panel element i, the repulsive force calculation unit 44 determines that the distance from the point #p to a point that is on the outer edge line of the triangular panel element i and closest to the projective point #$h_i$ is the shortest distance.

The above process is expressed by formulas below. The projective point #$h_i$ of the point #p on a plane including the triangular panel element i is expressed by formula (13) below.

$$h_i = r_{1,i} + s_2 d r_{2,i} + s_3 d r_{3,i} \tag{13}$$

When $d\#r_{2,i} = r_{2,i} - r_{1,i}$ and $d\#r_{3,i} = r_{3,i} - r_{1,i}$, #p−#$h_i$ is perpendicular to $d\#r_{2,i}$ and $d\#r_{3,i}$, and therefore formulas (14) and (15) are satisfied. The projective point #$h_i$ can be obtained by setting parameters $s_2$ and $s_3$ to satisfy both of formulas (14) and (15).

$$(p - h_i) \cdot dr_{2,i} = 0 \tag{14}$$

$$(p - h_i) \cdot dr_{3,i} = 0 \tag{15}$$

After the projective point #$h_i$ is obtained, the repulsive force calculation unit 44 calculates the shortest distance between the point #p and the triangular panel element i in different manners depending on the cases described below.

(1) When $s_2 \geq 0$, $s_3 \geq 0$, and $s_2 + s_3 \geq 1$, the projective point #$h_i$ is included in the triangular panel element i. In this case, the shortest distance $d_{\#p,3}$ (#$r_{1,i}$, #$r_{2,i}$, #$r_{3,i}$) between the point #p and each triangular panel element i is expressed by formula (16) below.

$$d_{p,3}(r_{1,i}, r_{2,i}, r_{3,i}) = |p - h_i| \tag{16}$$

Figure 14:
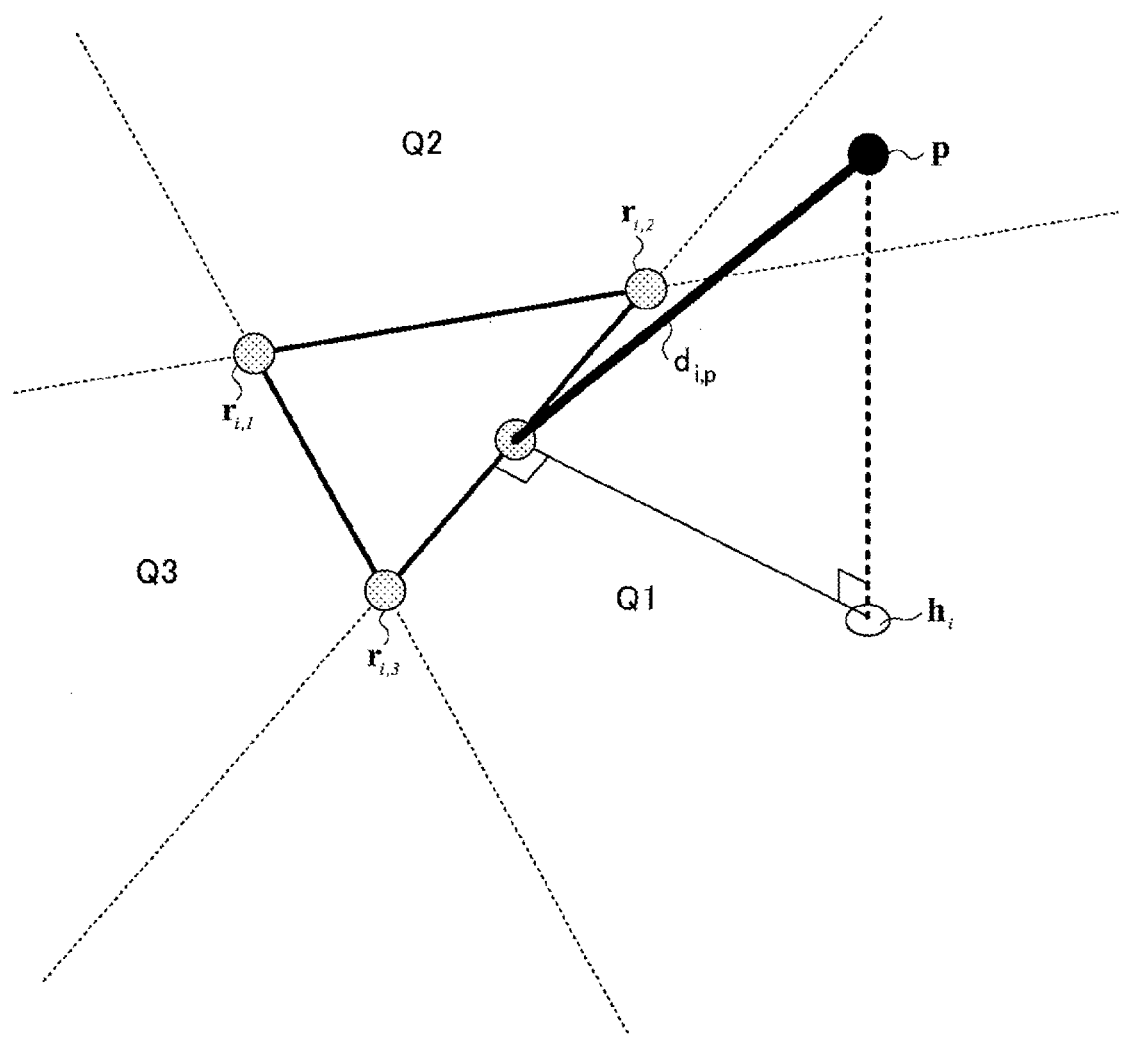
FIG. 14 is a drawing illustrating a plane that includes a triangular panel element and is divided into regions where a projective point of a point #p possibly exists depending on cases.

(2) When $s_2 < 0$, $s_3 < 0$, and $s_2 + s_3 \geq 1$, the projective point #$h_i$ is in a region Q1 of FIG. 14. FIG. 14 is a drawing illustrating a plane that includes the triangular panel element i and is divided into regions where a projective point of the point #p possibly exists depending cases. In this case, a problem to obtain the shortest distance $d_{\#p,3}$ (#$r_{1,i}$, #$r_{2,i}$, #$r_{3,i}$) between the point #p and the triangular panel element i is represented by a problem to obtain the shortest distance between the point #p and a line segment. Therefore, the repulsive force calculation unit 44 uses the method of the first embodiment to obtain the shortest distance. That is, the repulsive force calculation unit 44 obtains the shortest distance $d_{\#p,3}$ (#$r_{1,i}$, #$r_{2,i}$, #$r_{3,i}$) between the point #p and each triangular panel element i (connection element) by using formula (17) that is obtained by substituting #$r_{2,i}$ for #$r_{s,i}$ and #$r_{3,i}$ for #$r_{e,i}$.

$$d_{p,3}(r_{1,i}, r_{2,i}, r_{3,i}) = d_{p,2}(r_{2,i}, r_{3,i}) \tag{17}$$

(2) When $s_2 \geq 0$, $s_3 < 0$, and $s_2 + s_3 \geq 1$, the projective point #$h_i$ is in a region Q2 of FIG. 14. Also in this case, a problem to obtain the shortest distance $d_{\#p,3}$ (#$r_{1,i}$, #$r_{2,i}$, #$r_{3,i}$) between the point #p and the triangular panel element i is represented by a problem to obtain the shortest distance between the point #p and a line segment. Therefore, the repulsive force calculation unit 44 uses the method of the first embodiment to obtain the shortest distance. That is, the repulsive force calculation unit 44 obtains the shortest distance $d_{\#p,3}$ (#$r_{1,i}$, #$r_{2,i}$, #$r_{3,i}$) between the point #p and each triangular panel element i (connection element) by using formula (18) that is obtained by substituting #$r_{1,i}$ for #$r_{s,i}$ and #$r_{2,i}$ for #$r_{e,i}$.

$$d_{p,3}(r_{1,i}, r_{2,i}, r_{3,i}) = d_{p,2}(r_{1,i}, r_{2,i}) \tag{18}$$

(3) When $s_2 < 0$, $s_3 \geq 0$, and $s_2 + s_3 \geq 1$, the projective point #$h_i$ is in a region Q3 of FIG. 14. Also in this case, a problem to obtain the shortest distance $d_{\#p,3}$ (#$r_{1,i}$, #$r_{2,i}$, #$r_{3,i}$) between the point #p and the triangular panel element i is represented by a problem to obtain the shortest distance between the point #p and a line segment. Therefore, the repulsive force calculation unit 44 uses the method of the first embodiment to obtain the shortest distance. That is, the repulsive force calculation unit 44 obtains the shortest distance $d_{\#p,3}$ (#$r_{1,i}$, #$r_{2,i}$, #$r_{3,i}$) between the point #p and each triangular panel element i (connection element) by using formula (19) that is obtained by substituting #$r_{3,i}$ for #$r_{s,i}$ and #$r_{1,i}$ for #$r_{e,i}$.

$$d_{p,3}(r_{1,i}, r_{2,i}, r_{3,i}) = d_{p,2}(r_{3,i}, r_{1,i}) \tag{19}$$

(5) In a case other than the cases (1) through (4) described above, the shortest distance $d_{\#p,3}$ (#$r_{1,i}$, #$r_{2,i}$, #$r_{3,i}$) between the point #p and the panel element i is represented by a distance between the projective point #$h_i$ and one of the vertices of the triangular panel element i. Therefore, the repulsive force calculation unit 44 obtains the shortest distance $d_{\#p,3}$ (#$r_{1,i}$, #$r_{2,i}$, #$r_{3,i}$) between the point #p and each triangular panel element i based on formula (20) below.

$$d_{p,3}(r_{1,i}, r_{2,i}, r_{3,i}) = \min(|p - r_{1,i}|, |p - r_{2,i}|, |p - r_{3,i}|) \tag{20}$$

The repulsive force calculation unit 44 obtains the shortest distances $d_{\#p,3}$ (#$r_{1,i}$, #$r_{2,i}$, #$r_{3,i}$) between the point #p and the respective triangular panel elements i through the process described above. Next, the repulsive force calculation unit 21 calculates a distance $d_{\#p,min,3}$ that is the smallest one of the shortest distances $d_{\#p,3}$ (#$r_{1,i}$, #$r_{2,i}$, #$r_{3,i}$) between the point #p and the respective triangular panel elements i according to formula (21) below. Also, the repulsive force calculation unit 44 defines a potential function $\psi$ based on the distance $d_{\#p,min,3}$ and formula (22) below, and calculates a repulsive force $f_{D1E}$ between the particle D1 and the object E by differentiating the potential function $\psi$.

$$d_{p,min,3} = \min_i d_{p,3}(r_{1,i}, r_{2,i}, r_{3,i}) \tag{21}$$

$$\varphi(p, r_{1,0}, r_{2,0}, r_{3,0}, r_{1,1} r_{2,1}, r_{3,1}, \ldots, r_{1,i}, r_{2,i}, r_{3,i}, \ldots) = \tag{22}$$
$$\begin{cases} (1 - \log(d_{p,min,3}/r_0) - d_{p,min,3}/r_0) & d_{p,min,3} < r_0 \\ 0 & \text{otherwise} \end{cases}$$

The motion analysis unit 46 analyzes the motion of the objects D and E based on the repulsive force $f_{D1E}$ calculated by the repulsive force calculation unit 44 and other physical quantities (gravity, velocity, rotational speed, etc.). Descriptions of motion analysis based on forces being exerted on objects are omitted here, because various methods are already known.

Figure 15:
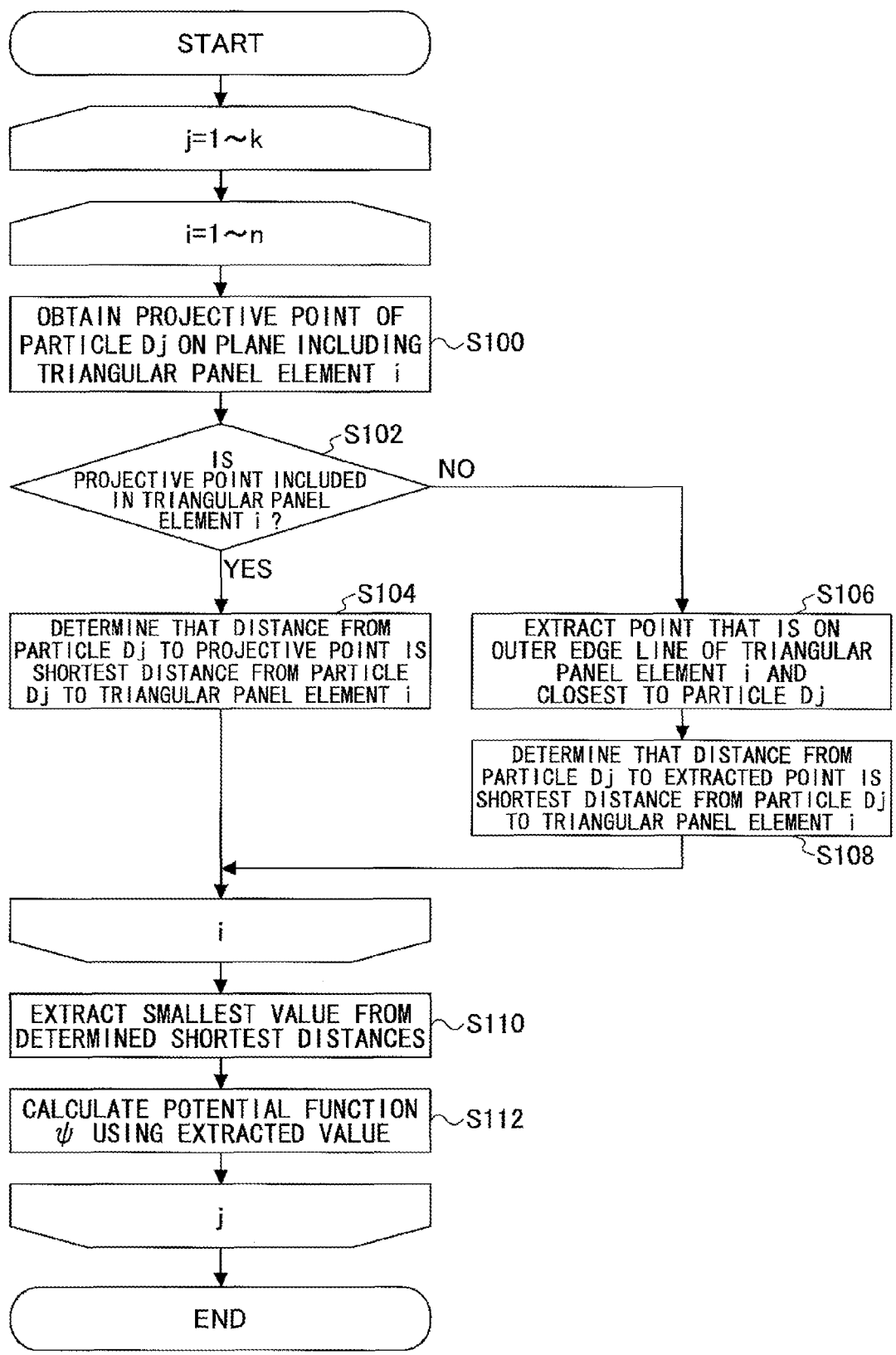
FIG. 15 is a flowchart illustrating a process performed by a repulsive force calculation unit of the second embodiment.

Below, the above process of the repulsive force calculation unit 44 is described with reference to a flowchart. FIG. 15 is a flowchart illustrating a process performed by the repulsive force calculation unit 44 of the second embodiment. In this process, it is assumed that the object D includes multiple particles (D1, D2, D3, . . . ).

The repulsive force calculation unit 44 performs steps S100 through S112 for each of particles Dj (j=1 through k) constituting the object D. Also, the repulsive force calculation unit 44 performs steps S100 through S108 for each of triangular panel elements i (i=1 through n).

The repulsive force calculation unit 44 obtains a projective point #$h_i$ of the particle Dj on a plane including the triangular panel element i (S100).

Next, the repulsive force calculation unit 44 determines whether the projective point #$h_i$ is included in the triangular panel element i (S102).

When the projective point #$h_i$ is included in the triangular panel element i, the repulsive force calculation unit 44 determines that the distance between the particle Dj and the projective point #$h_i$ is the shortest distance between the particle Dj and the triangular panel element i (S104).

When the projective point #$h_i$ is not included in the triangular panel element i, the repulsive force calculation unit 44 extracts a point that is on the outer edge line (including vertices) of the triangular panel element i and closest to the particle Dj (S106). Next, the repulsive force calculation unit 44 determines that the distance between the particle Dj and the extracted point is the shortest distance between the particle Dj and the triangular panel element i (S108).

After performing steps S100 through S108 for all of the triangular panel elements i, the repulsive force calculation unit 44 extracts the smallest value from the shortest distances calculated for the respective triangular panel elements i (S110).

Then, the repulsive force calculation unit 44 calculates a potential function indicating a repulsive force between the particle Dj and the object E based on the extracted value (S112).

Advantageous effects of the above process are substantially the same as those described in the first embodiment. Also, comparison with the related art is omitted here because it can be done by applying the descriptions related to the comparison in the first embodiment to a three-dimensional space.

An object motion analysis apparatus, an object motion analysis method, and an object motion analysis program according to the above embodiment can quickly obtain an analysis result while preventing generation of an analysis result indicating unphysical behavior.

Third Embodiment

An object motion analysis apparatus, an object motion analysis method, and an object motion analysis program according to the third embodiment of the present invention are described below. An object motion analysis apparatus 3 of the third embodiment includes functions for solving a two-dimensional fluid-structure coupled problem in addition to the functions of the object motion analysis apparatus 1 of the first embodiment.

The hardware configuration of the object motion analysis apparatus 3 of the third embodiment is substantially the same as that described in the first and second embodiments, and therefore the description of the hardware configuration is omitted here.

[Functional Configuration]

Figure 16:
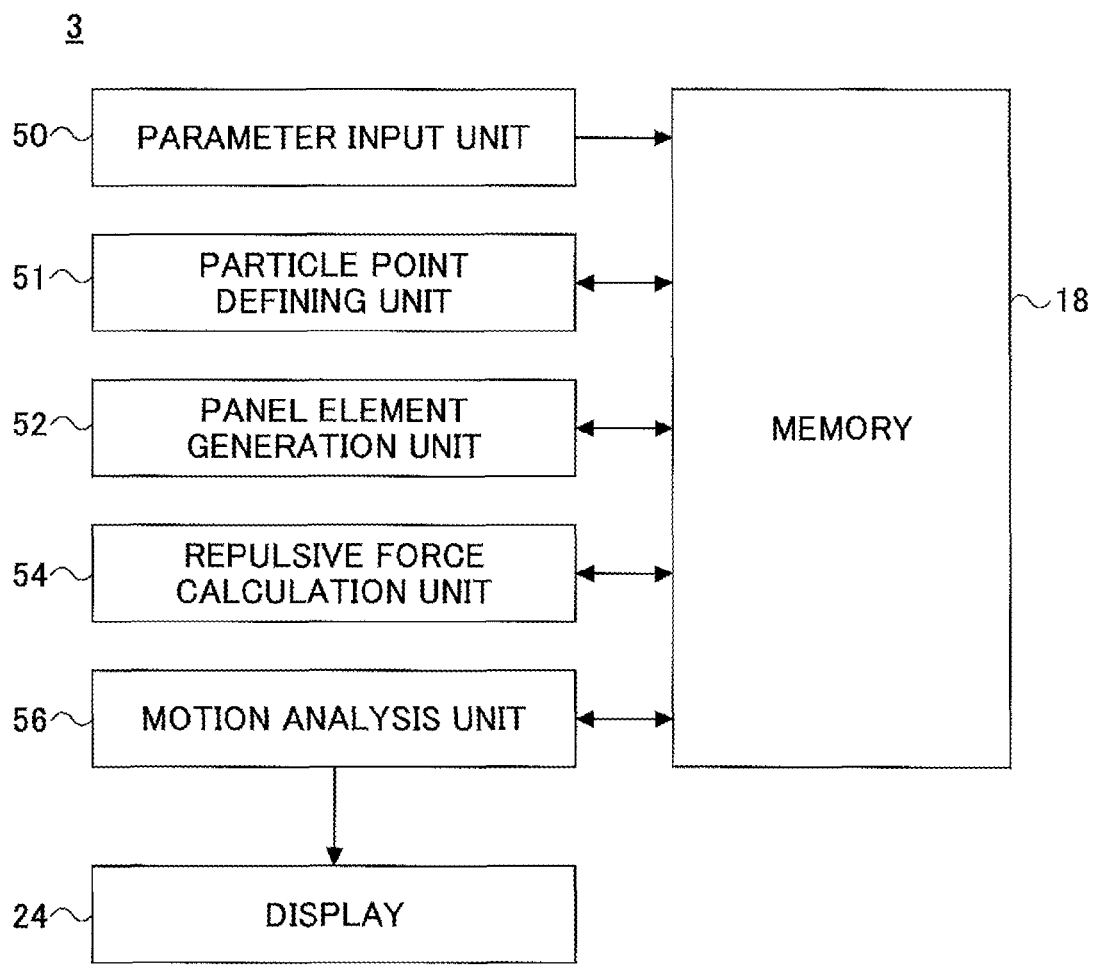
FIG. 16 is a block diagram illustrating an exemplary functional configuration of an object motion analysis apparatus according to a third embodiment.

FIG. 16 is a block diagram illustrating an exemplary functional configuration of the object motion analysis apparatus 3 according to the third embodiment of the present invention. The object motion analysis apparatus 3 includes a parameter input unit 50, a particle point defining unit 51, a panel element generation unit 52, a repulsive force calculation unit 54, and a motion analysis unit 56. These functional blocks are implemented by executing programs or software stored in, for example, the secondary storage 16 by the CPU 10. These functional blocks may not necessarily be implemented by separate programs. Instead, the functional blocks may be provided as subroutines or functions that are called by another program. Also, some of the functional blocks may be implemented by hardware components such as an integrated circuit (IC) and a field programmable gate array (FPGA). Functions of the functional blocks are described later together with descriptions of a process illustrated by FIG. 19.

Figure 17:
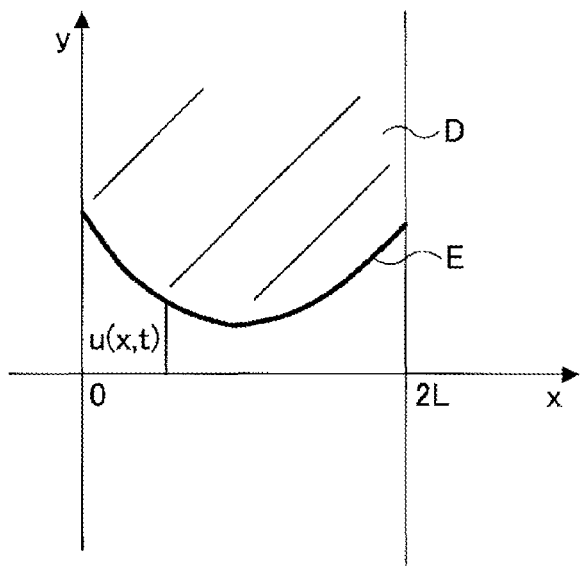
FIG. 17 is a drawing illustrating a two-dimensional fluid-structure coupled problem that is processed by the object motion analysis apparatus of the third embodiment.

The object motion analysis apparatus 3 can process a problem of governing equations where a two-dimensional rubber film (an example of the object E in the first embodiment) and a fluid (an example of the object D in the first embodiment) interact with each other. FIG. 17 is a drawing illustrating a two-dimensional fluid-structure coupled problem that is processed by the object motion analysis apparatus 3. As illustrated by FIG. 17, the object motion analysis apparatus 3 analyzes the motion of a rubber film E and a fluid D such as pure water in a system where the fluid D is placed on the rubber film E. Below, a height in this system is expressed by a y coordinate, and a lateral position in this system is expressed by an x coordinate.

First, governing equations processed by the object motion analysis apparatus 3 are defined by formulas (23) through (26). In the formulas, u(x, t) is a function representing a height of each particle of the rubber film E corresponding to a position x at time t. Also, ρ(x, y, t), p(x, y, t), and #v(x, y, t) represent a density field, a pressure field, and a velocity field of the fluid D, respectively. Further, #F indicates an external force. Here, #F indicates gravity. Formula (23) represents the conservation of momentum of the rubber film E, formula (24) represents the conservation of mass of the fluid D, formula (25) represents the conservation of momentum of the fluid D, and formula (26) is an equation of state of the fluid D.

$$\sigma \frac{\partial^2 u}{\partial t^2} = -\alpha \frac{\partial u}{\partial t} + \gamma \Delta u + P_u \quad (23)$$

$$\frac{D\rho}{Dt} = -\rho \nabla \cdot v \quad (24)$$

$$\frac{Dv}{Dt} = -\frac{1}{\rho}\nabla p + F \quad (25)$$

$$p = c^2(\rho - \rho_0) \quad (26)$$

Also in the formulas, $P_u$ indicates a force with which the fluid D presses the rubber film E. The term $P_u$ is obtained as described below. A force applied to a micro element of a film between (x−dx/2) and (x+dx/2) is represented by −p(x,u(x)) d#S·#ŷ. Here, d#S indicates an area vector having an area of the micro element and an outward normal direction, and #ŷ indicates a unit vector in the y-direction. Because d#S=(−$u_x$, 1)dx, $P_u$ is expressed by formula (27) as a force per unit length.

$$Pu = -p(x,u(x)) \quad (27)$$

When ∂u/∂t=η and "u" is represented by u(i×dx, n×dt)=$u_i^n$ by equally dividing the space by dx into m segments and equally dividing the time by dt, formula (23) can be discretized as expressed by formulas (28) through (30) below. In the formulas, #u*=($u_0^*$, $u_1^*$, ..., $u_i^*$, ..., $u_m^*$) indicates a vector where values $u_i^*$ at division points are arrayed. Also, $\psi_b$ indicates a potential function obtained based on distances between a given particle b of the fluid D and panel elements. Further, a superscript "*" indicates an intermediate value regarding time. The second term in formula (29) indicates an internal force of the rubber film E which is multiplied by a tension coefficient γ.

$$\frac{u_i^* - u_i^n}{dt} = \frac{\eta_i^n}{2} \quad (28)$$

$$\sigma \frac{\eta_i^{n+1} - \eta_i^n}{dt} = -\alpha \eta_i^n + \gamma \frac{u_{i+1}^* - 2u_i^* + u_{i-1}^*}{dx^2} - \sum_b \beta \frac{\partial \varphi_b(u^*, r_b^{n+1/2})}{\partial u_i^*} \quad (29)$$

$$\frac{u_i^{n+1} - u_i^*}{dt} = \frac{\eta_i^{n+1}}{2} \quad (30)$$

Figure 18:
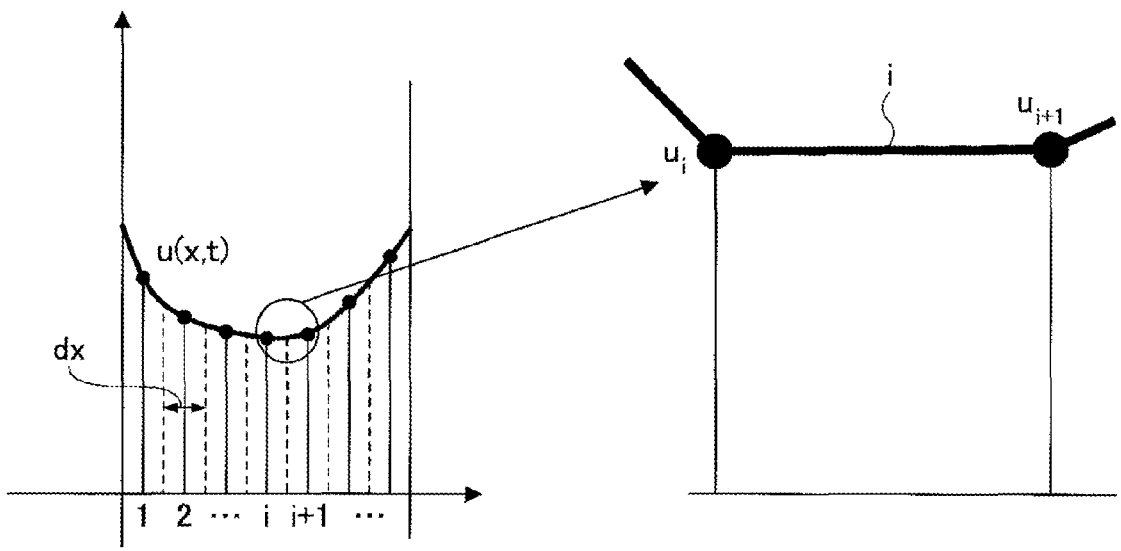
FIG. 18 is a drawing used to describe a method of defining division points (particles) by dividing a rubber film and generating panel elements connecting the division points.

FIG. 18 is a drawing used to describe a method of defining division points (particles) by dividing a rubber film and generating panel elements connecting the division points (particles). As illustrated by FIG. 18, a rubber film whose height is expressed by u(x, t) is equally divided into m segments having a width dx, and the center coordinates of the respective segments are recognized as the coordinates $(u_1, u_2, \ldots, u_i, u_{i+1}, \ldots)$ of hypothetical particles. Then, line segments connecting the recognized hypothetical particles are recognized and processed as panel elements i or connection elements.

Assuming that a segment element formed by a point (i×dx, $u_i^*$) and a point ((i+1)×dx, $u_{i+1}^*$) is an i-th panel element, the rubber film consists of m−1 panel elements.

When the potential function $\psi_b$ is defined according to the process described in the first embodiment using $$(p = r_b^*, r_{s,i} = (i \times dx, u_i^*), r_{e,i} = ((i+1) \times dx, u_{i+1}^*))$$

the potential function $\psi_b$ takes only parameters $\#r_b^*$ and $\#u^*$. Therefore, the potential function $\psi_b$ is expressed as $\psi_b(\#r_b^*, \#u^*)$.

Here, it is difficult to analytically obtain a differential $\partial \phi_b(\#r_b^*, \#u^*)/\partial u_i^*$ of the potential function $\psi_b$. Therefore, in the present embodiment, the differential $\partial \phi_b(\#r_b^*, \#u^*)/\partial u_i^*$ is obtained by difference approximation expressed by formula (31) below. In formula (31), it is assumed that $u_{i,+}^* = (u_0^*, u_1^*, \ldots, u_i^* + \delta, \ldots, u_m^*)$ and $u_{i,-}^* = (u_0^*, u_1^*, \ldots, u_i^* - \delta, \ldots, u_m^*)$. Also, δ is a constant that is, for example, $10^{-8}$. Formula (31) indicates a repulsive force that the panel elements receive from the fluid.

$$\frac{\partial \varphi_b(r_b^*, u^*)}{\partial u_i^*} = \frac{\varphi_b(r_b^*, u_{i,+}^*) - \varphi_b(r_b^*, u_{i,-}^*)}{2\delta} \quad (31)$$

Fluid equations (24) through (26) are discretized based on the SPH method using formulas (32) through (35) below. In the formulas, β indicates a constant. $L_2(\#r_a^*)$ indicates a two-dimensional re-normalized matrix and is expressed by formula (36).

$$r_a^* = r_a^n + \frac{dt}{2} v_a^n \quad (32)$$

$$v_a^{n+1} = \quad (33)$$

$$v_a^n - 2dt \left[ \sum_b m_b \left( \frac{p_{ab}^{n+1/2}}{\rho_b^n \rho_a^n} \right) \left( \frac{L_2(r_a^*) + L_2(r_b^*)}{2} \right) \frac{r_a^* - r_b^*}{|r_a^* - r_b^*|} \frac{\partial W(r_{ab}^*, h)}{\partial r_{ab}^*} \right] -$$

$$\frac{\beta}{m_a} \frac{\partial \varphi_a(u^*, r_a^*)}{\partial r_a^*} + F$$

$$\rho_a^{n+1} = \rho_a^n + 2dt \sum_b \frac{m_b \rho_a^n}{\rho_b^n} \left( \frac{v_a^{s,n+1} + v_a^{s,n}}{2} - v_{ab}^{s,n+1/2} \right) \frac{\partial}{\partial r_{ab}^*} W(r_{ab}^*, h) \quad (34)$$

$$r_a^{n+1} = r_a^* + \frac{dt}{2} v_a^{n+1} \quad (35)$$

$$L_2(r_a^*) = \quad (36)$$

$$\begin{pmatrix} \sum_b (x_b^* - x_a^*) \frac{\partial}{\partial x} W(|r_a^* - r_b^*|, h) & \sum_b (x_b^* - x_a^*) \frac{\partial}{\partial y} W(|r_a^* - r_b^*|, h) \\ \sum_b (y_b^* - y_a^*) \frac{\partial}{\partial x} W(|r_a^* - r_b^*|, h) & \sum_b (y_b^* - y_a^*) \frac{\partial}{\partial y} W(|r_a^* - r_b^*|, h) \end{pmatrix}^{-1}$$

Here, the following equations are satisfied.

$$r_{ab}^* = r_a^* - r_b^*,$$

$$r_{ab}^* = |r_{ab}^*|,$$

$$v_a^{s,n} = v_a^n \cdot \frac{r_{ab}^*}{|r_{ab}^*|},$$

$$v_b^{s,n} = v_b^n \cdot \frac{r_{ab}^*}{|r_{ab}^*|}$$

In the above formulas, $p_{ab}^{n+1/2}$ and $V_{ab}^{n+1/2}$ are space-time intermediate values obtained by solving a one-dimensional Riemann problem between particles a and b of the fluid. More specifically, $p_{ab}^{n+1/2}$ and $v_{ab}^{n+1/2}$ are obtained as described below.

First, characteristic functions represented by formulas (37) through (40) are defined for the particles a and b included in the fluid.

$$q_a^{n,+} = \log(\rho_a^n) + \frac{v_a^{s,n}}{c} \quad (37)$$

$$q_a^{n,-} = \log(\rho_a^n) - \frac{v_a^{s,n}}{c} \quad (38)$$

$$q_b^{n,+} = \log(\rho_b^n) + \frac{v_b^{s,n}}{c} \quad (39)$$

$$q_b^{n,-} = \log(\rho_b^n) - \frac{v_b^{s,n}}{c} \quad (40)$$

Next, gradients are calculated using formulas (41) through (46) below. In the formulas, superscripts accompanying the velocity indicate coordinate components.

$$\nabla \log(\rho)|_a = \sum_k \frac{m_k}{\rho_a} (\log(\rho_k) - \log(\rho_a)) \frac{\partial W(|r_a^* - r_k^*|, h)}{\partial r_a^*} \quad (41)$$

$$\nabla v|_{a,2} = \quad (42)$$

$$\begin{pmatrix} \sum_k \frac{m_k}{\rho_a} (v_k^x - v_a^x) \frac{\partial W(|r_a^* - r_k^*|, h)}{\partial x_a^*} & \sum_k \frac{m_k}{\rho_a} (v_k^y - v_a^y) \frac{\partial W(|r_a^* - r_k^*|, h)}{\partial x_a^*} \\ \sum_k \frac{m_k}{\rho_a} (v_k^x - v_a^x) \frac{\partial W(|r_a^* - r_k^*|, h)}{\partial y_a^*} & \sum_k \frac{m_k}{\rho_a} (v_k^y - v_a^y) \frac{\partial W(|r_a^* - r_k^*|, h)}{\partial y_a^*} \end{pmatrix}$$

$$\nabla q|_a^{n,+} = \nabla \log(\rho)|_a + \frac{\nabla v|_{a,2} r_{ab}}{c} \quad (43)$$

-continued $$\nabla q|_b^{n,+} = \nabla \log(\rho)|_b + \frac{\nabla v|_{b,2} r_{ab}}{c} \quad (44)$$

$$\nabla q|_a^{n,-} = \nabla \log(\rho)|_a - \frac{\nabla v|_{a,2} r_{ab}}{c} \quad (45)$$

$$\nabla q|_b^{n,-} = \nabla \log(\rho)|_b - \frac{\nabla v|_{b,2} r_{ab}}{c} \quad (46)$$

With the characteristic functions and the gradients, $p_{ab}^{n+1/2}$ and $v_{ab}^{n+1/2}$ can be determined using formulas (47) through (51) below, and the differential of the potential function $\psi$ expressed by formula (33) above can be obtained by difference approximation expressed by formula (51) below.

$$q_{ab}^{n+1/2,+} = q_b^{n,+} + \left(\frac{|r_{ab}|}{2} - \frac{cdt}{2}\right)(r_{ab} \cdot \nabla q|_b^{n,+}) \quad (47)$$

$$q_{a,b}^{n+1/2,-} = q_a^{n,+} - \left(\frac{|r_{ab}|}{2} + \frac{cdt}{2}\right)(r_{ab} \cdot \nabla q|_a^{n,-}) \quad (48)$$

$$\rho_{ab}^{n+1/2} = \exp\left(\frac{q_{ab}^{n+1/2,+} + q_{ab}^{n+1/2,-}}{2}\right) \quad (49)$$

$$v_{ab}^{n+1/2} = c\left(\frac{q_{ab}^{n+1/2,+} - q_{ab}^{n+1/2,-}}{2}\right) \quad (50)$$

$$p_{ab}^{n+1/2} = c^2(\rho_{ab}^{n+1/2} + \rho_0) \quad (51)$$

Here, the following equations are satisfied.

$$r_{a,x,-}^* = (x_a^* + \delta, y_a^*), r_{a,x,-}^* = (x_a^* - \delta, y_a^*), r_{a,y,+}^* = (x_a^*, y_a^* + \delta), r_{a,y,-}^* = (x_a^*, y_a^* - \delta)$$

Formula (52) below indicates a repulsive force that the fluid receives from the panel elements.

$$\frac{\partial \varphi_a(u^*, r_a^*)}{\partial r_a^*} = \begin{pmatrix} \frac{\varphi_a(u^*, r_{a,x,+}^*) - \varphi_a(u^*, r_{a,x,-}^*)}{2\delta}, \\ \frac{\varphi_a(u^*, r_{a,y,+}^*) - \varphi_a(u^*, r_{a,y,-}^*)}{2\delta} \end{pmatrix} \quad (52)$$

With the above calculations, the motion analysis theory described in the first embodiment can be applied to a two-dimensional fluid-structure coupled problem. Similarly, the motion analysis theory described in the second embodiment can also be applied to a model where data is given for a fluid and a structure.

Figure 19:
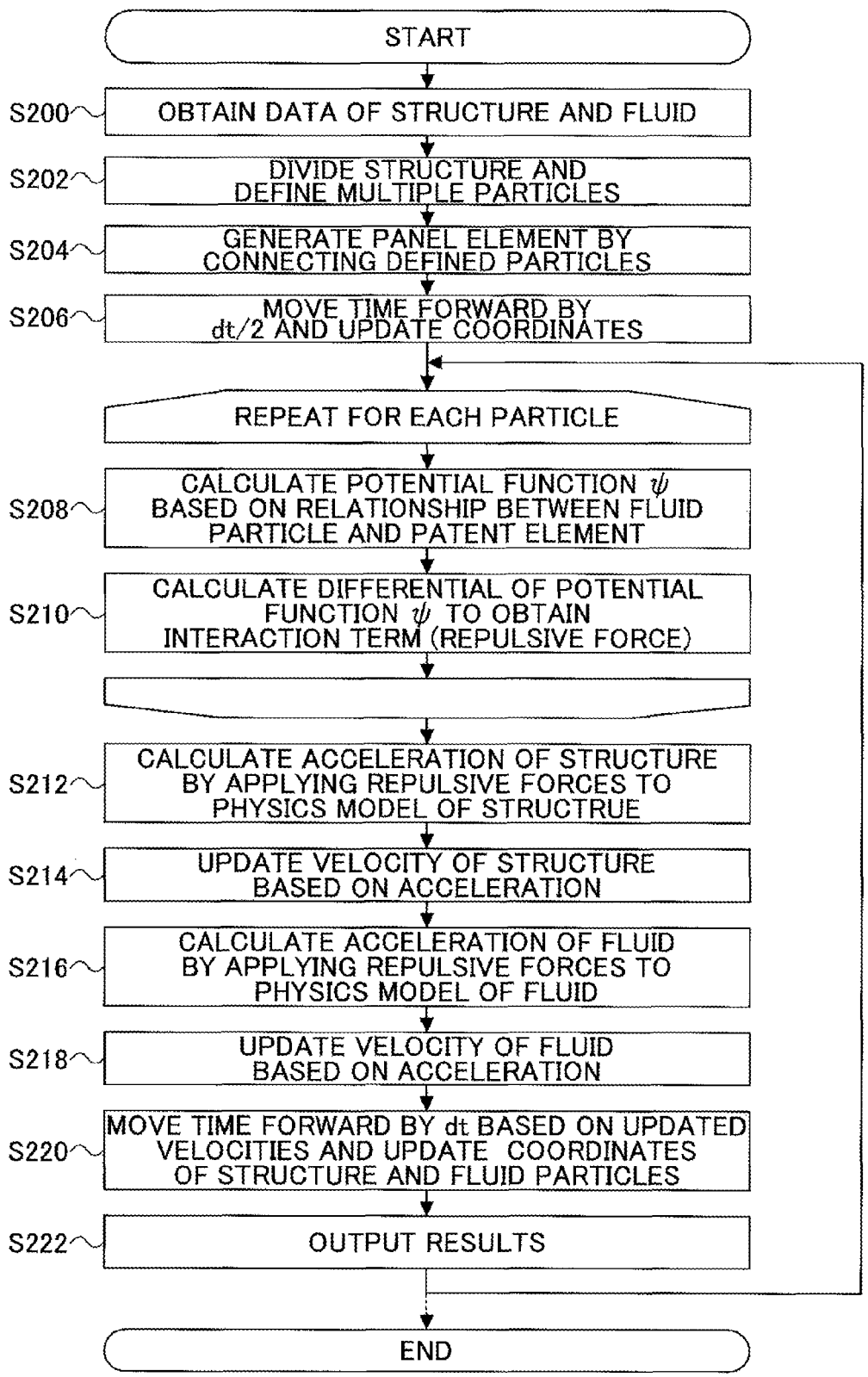
FIG. 19 is a flowchart illustrating a process performed by the object motion analysis apparatus of the third embodiment.

FIG. 19 is a flowchart illustrating a process performed by the object motion analysis apparatus 3 of the third embodiment. Although the process of this flowchart is described using a structure and a fluid, the process can also be applied to analyze the interaction between structures and the interaction between fluids.

First, the parameter input unit 50 obtains data of a structure (e.g., a rubber film) and a fluid (S200). The data obtained by the parameter input unit 50 includes the coordinates, velocity, mass, and connection relationship (including a tension coefficient) of the structure, and the coordinates, velocity, and mass of particles constituting the fluid.

Next, the particle point defining unit 51 defines multiple hypothetical particles by dividing the structure as described above (S202). Details of this step are described above with reference to FIG. 18. The particle point defining unit 51 divides, for example, the outer edge (boundary line) of the structure at desired intervals and defines hypothetical particles. This configuration enables the panel element generation unit 52 to generate panel elements even when data defining particles is not provided as input data. Thus, similarly to the first and second embodiments, the third embodiment also makes it possible to quickly obtain an analysis result and prevent generation of an analysis result indicating unphysical behavior even when particle data is not provided as input data.

Next, the panel element generation unit 52 generates panel elements by connecting the hypothetical particles defined by the particle point defining unit 51 (S204).

Next, the motion analysis unit 56 moves the time forward by dt/2 and updates the coordinates of the particles of the structure and the fluid and the coordinates of the panel elements based on the coordinates and velocity input at step S200 and the data of the panel elements generated at steps S202 and S204 (S206).

Next, the repulsive force calculation unit 54 performs steps S208 and S210 for each of particles (which are hereafter referred to as "fluid particles") constituting the fluid.

The repulsive force calculation unit 54 retrieves a fluid particle and calculates a potential function $\psi$ based on the positional relationship between the fluid particle and the panel elements (S208). Then, the repulsive force calculation unit 54 calculates the differential of the potential function to obtain an interaction term (a repulsive force between the fluid particle and the panel elements) (S210).

After repulsive forces between the fluid particles and the panel elements are calculated at steps S208 and S210, the motion analysis unit 56 calculates the acceleration of the structure by applying the calculated repulsive forces to a physics model of the structure (S212), and updates the velocity of the structure based on the calculated acceleration (S214).

Next, the motion analysis unit 56 calculates the acceleration of the fluid particles by applying the calculated repulsive forces to a physics model of the fluid (S216), and updates the velocity of the fluid particles based on the calculated acceleration (S218).

Then, the motion analysis unit 56 moves the time forward by dt based on the updated velocity of the structure and the updated velocity of the fluid particles, and updates the coordinates of the structure and the fluid particles (S220).

Further, the motion analysis unit 56 outputs the updated coordinates of the structure and the fluid particles to, for example, the display 24 (S222), and the process returns to step S208. The object motion analysis apparatus 3 may be set in advance to terminate the process after repeating the loop of steps S208 through S222.

FIG. 20 is a drawing illustrating states of a rubber film at different stages in a simulation performed according to a method of an embodiment of the present invention. In the simulation, the following parameters are given to the object motion analysis apparatus 1: L=0.292 [m], c=100 [m/s], M=80, dx=2 L/M [m], dt=dx/(5c) [s], σ=10 [kg/m], α=3 [kgm], and γ=250 [N/s].

Also in the simulation, the initial density of the fluid is set at a constant level of $\rho_a^0$=1000 [kg/m$^2$], the mass of each fluid particle is set at $\rho_a^0/(dx)^2$, h is set at 2dx, and the number of particles is set at 2054.

Results of the simulation of FIG. 20 indicate that unphysical behavior where the fluid D penetrates through the rubber film E is not observed during calculations even when the rubber film E is stretched greatly.

An object motion analysis apparatus, an object motion analysis method, and an object motion analysis program according to the above embodiment can quickly obtain an analysis result while preventing generation of an analysis result indicating unphysical behavior.

Adding the particle point defining unit 51 that defines multiple hypothetical particles by dividing a structure enables the panel element generation unit 52 to generate panel elements even when particle data is not provided as input data. Thus, similarly to the first and second embodiments, the third embodiment also makes it possible to quickly obtain an analysis result and prevent generation of an analysis result indicating unphysical behavior where an object penetrates through a boundary, even when particle data is not provided as input data.

Preferred embodiments of the present invention are described above. However, the present invention is not limited to the specifically disclosed embodiments, and variations and modifications may be made without departing from the scope of the present invention.

In the first through third embodiments, the smallest value of the shortest distances between a particle and panel elements is extracted, and a potential function $\psi$ is defined based on the extracted value. That is, the potential function $\psi$ is defined taking into account only the panel element that is closest to the particle. However, the present invention is not limited to the above embodiments. For example, a potential function $\psi$ may be defined and a repulsive force may be calculated for each combination of a particle and respective panel elements.

An aspect of this disclosure makes it possible to provide an object motion analysis apparatus, an object motion analysis method, and an object motion analysis program where generation of an analysis result indicating unphysical behavior is prevented.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An object motion analysis apparatus, comprising:
a processor configured to
generate a connection element connecting multiple first particles included in a first object based on physical quantity data of the first particles;
refer to physical quantity data of a second particle included in a second object;
calculate a shortest distance between the second particle and the generated connection element;
calculate a repulsive force between the first particles in the first object and the second particle in the second object based on the calculated shortest distance; and
analyze motion of the first object and the second object based on the calculated repulsive force.

2. The object motion analysis apparatus as claimed in claim 1, wherein the processor calculates the repulsive force such that
the repulsive force increases as the shortest distance between the second particle and the connection element decreases and approaches zero, and
the repulsive force approaches zero as the shortest distance between the second particle and the connection element increases and approaches a predetermined distance.

3. The object motion analysis apparatus as claimed in claim 1, wherein the processor is further configured to generate data of the first particles by dividing data representing a structure.

4. The object motion analysis apparatus as claimed in claim 1, wherein
the first object and the second object are on a same plane; and
the connection element is a segment element connecting the multiple particles in the first particles.

5. The object motion analysis apparatus as claimed in claim 1, wherein
the first object and the second object are in a three-dimensional space; and
the connection element is a closed area including three first particles selected from the first particles.

6. A method for analyzing motion of objects, the method comprising:
generating, by a processor of a computer, a connection element connecting multiple first particles included in a first object based on physical quantity data of the first particles;
referring to, by the processor, physical quantity data of a second particle included in a second object;
calculating, by the processor, a shortest distance between the second particle and the generated connection element;
calculating, by the processor, a repulsive force between the first particles in the first object and the second particle in the second object based on the calculated shortest distance; and
analyzing motion of the first object and the second object based on the calculated repulsive force.

7. The method as claimed in claim 6, wherein the repulsive force is calculated such that
the repulsive force increases as the shortest distance decreases and approaches zero, and
the repulsive force approaches zero as the shortest distance between the second particle and the connection element increases and approaches a predetermined distance.

8. The method as claimed in claim 6, further comprising:
generating, by the processor, data of the first particles by dividing data representing a structure.

9. The method as claimed in claim 6, wherein
the first object and the second object are on a same plane; and
the connection element is a segment element connecting the first particles.

10. The method as claimed in claim 6, wherein
the first object and the second object are in a three-dimensional space; and
the connection element is a closed area including three first particles selected from the first particles.

11. A non-transitory computer-readable recording medium having stored therein a program for causing a computer to execute a process for analyzing motion of objects, the process comprising:
generating a connection element connecting multiple first particles included in a first object based on physical quantity data of the first particles;
referring to physical quantity data of a second particle included in a second object;
calculating a shortest distance between the second particle and the generated connection element;
calculating a repulsive force between the first particles in the first object and the second particle in the second object based on the calculated shortest distance; and
analyzing motion of the first object and the second object based on the calculated repulsive force.

12. The non-transitory computer-readable recording medium as claimed in claim 11, wherein the repulsive force is calculated such that
- the repulsive force increases as the shortest distance decreases and approaches zero, and
- the repulsive force approaches zero as the shortest distance between the second particle and the connection element increases and approaches a predetermined distance.

13. The non-transitory computer-readable recording medium as claimed in claim 11, the process further comprising:
- generating data of the first particles by dividing data representing a structure.

14. The non-transitory computer-readable recording medium as claimed in claim 11, wherein
- the first object and the second object are on a same plane; and
- the connection element is a segment element connecting the first particles.

15. The non-transitory computer-readable recording medium as claimed in claim 11, wherein
- the first object and the second object are in a three-dimensional space; and
- the connection element is a closed area including three first particles selected from the first particles.

* * * * *